US008651730B2

(12) United States Patent
Barbi

(10) Patent No.: US 8,651,730 B2
(45) Date of Patent: Feb. 18, 2014

(54) METHOD FOR CONTROLLING LOADING OF FOODS IN A FOOD MIXING UNIT AND CORRESPONDING CONTROL APPARATUS

(75) Inventor: Alberto Barbi, Poggio Rusco (IT)

(73) Assignee: Dinamica Generale S.R.L., Poggio Rusco (IT)

( * ) Notice: Subject to any disclaimer, the term of this patent is extended or adjusted under 35 U.S.C. 154(b) by 314 days.

(21) Appl. No.: 13/088,060

(22) Filed: Apr. 15, 2011

(65) Prior Publication Data

US 2011/0261641 A1 Oct. 27, 2011

(30) Foreign Application Priority Data

Apr. 16, 2010 (IT) ............................. BO2010A0237

(51) Int. Cl.
*B01F 15/02* (2006.01)
(52) U.S. Cl.
USPC ....................................... 366/141; 119/51.01
(58) Field of Classification Search
USPC ......... 366/302, 306, 307, 314, 318–324, 603, 366/141; 241/101.76, 101.761, 101.8, 241/260.1, 605; 700/213; 701/50; 119/51.01, 51.02
See application file for complete search history.

(56) References Cited

U.S. PATENT DOCUMENTS

| | | | |
|---|---|---|---|
| 5,424,957 A * | 6/1995 | Kerkhoff et al. ............... | 700/240 |
| 6,032,084 A * | 2/2000 | Anderson et al. ............. | 700/241 |
| 6,216,053 B1 * | 4/2001 | Cureton et al. ................ | 700/104 |
| 6,516,270 B2 * | 2/2003 | Pavlak et al. .................. | 701/471 |
| 8,146,624 B2 * | 4/2012 | Ghiraldi ........................... | 141/83 |
| 2002/0007798 A1 * | 1/2002 | Pavlak et al. ............... | 119/51.01 |
| 2002/0116200 A1 * | 8/2002 | Cureton et al. .................... | 705/1 |
| 2005/0223905 A1 * | 10/2005 | Ghiraldi ........................... | 99/342 |
| 2009/0020076 A1 * | 1/2009 | Ghiraldi ....................... | 119/57.92 |
| 2011/0261641 A1 * | 10/2011 | Barbi ............................. | 366/141 |
| 2011/0320033 A1 * | 12/2011 | Bresciani et al. ............. | 700/213 |
| 2012/0287745 A1 * | 11/2012 | Ghiraldi ....................... | 366/152.1 |
| 2012/0312240 A1 * | 12/2012 | Bachman et al. ........... | 119/51.01 |
| 2012/0312241 A1 * | 12/2012 | Bachman et al. ........... | 119/51.02 |
| 2013/0092087 A1 * | 4/2013 | Bachman et al. ........... | 119/51.01 |

FOREIGN PATENT DOCUMENTS

| | | | | |
|---|---|---|---|---|
| EP | 1 577 663 A1 | 9/2005 | | |
| EP | 2 011 390 A1 | 1/2009 | | |
| EP | 2011390 A1 * | 1/2009 | ............... | A01K 5/00 |
| EP | 2204088 A1 * | 7/2010 | ............... | A01K 5/02 |
| WO | WO 2005/067704 A1 | 7/2005 | | |

OTHER PUBLICATIONS

Italian Search Report dated Feb. 24, 2011.

* cited by examiner

*Primary Examiner* — Charles E Cooley
(74) *Attorney, Agent, or Firm* — Greer, Burns & Crain, Ltd.

(57) ABSTRACT

A food mixing unit is equipped with a weighing system having a memory device for storing at least one recipe of foods to be loaded into the mixing unit and at least one weight detecting device to detect the weight of the foods loaded. Foods to be loaded are taken from relative stocking areas and the food weight is controlled by the weight detecting device and based on the food recipe, as foods are loaded into the mixing unit. A plurality of chemical and/or physical parameters is measured for each of the food stored in the relative stocking areas by using of a food analysis tool and the food recipe is modified according to the measured values of chemical and/or physical parameters and rewritten in the memory device of the weighing system.

10 Claims, 1 Drawing Sheet

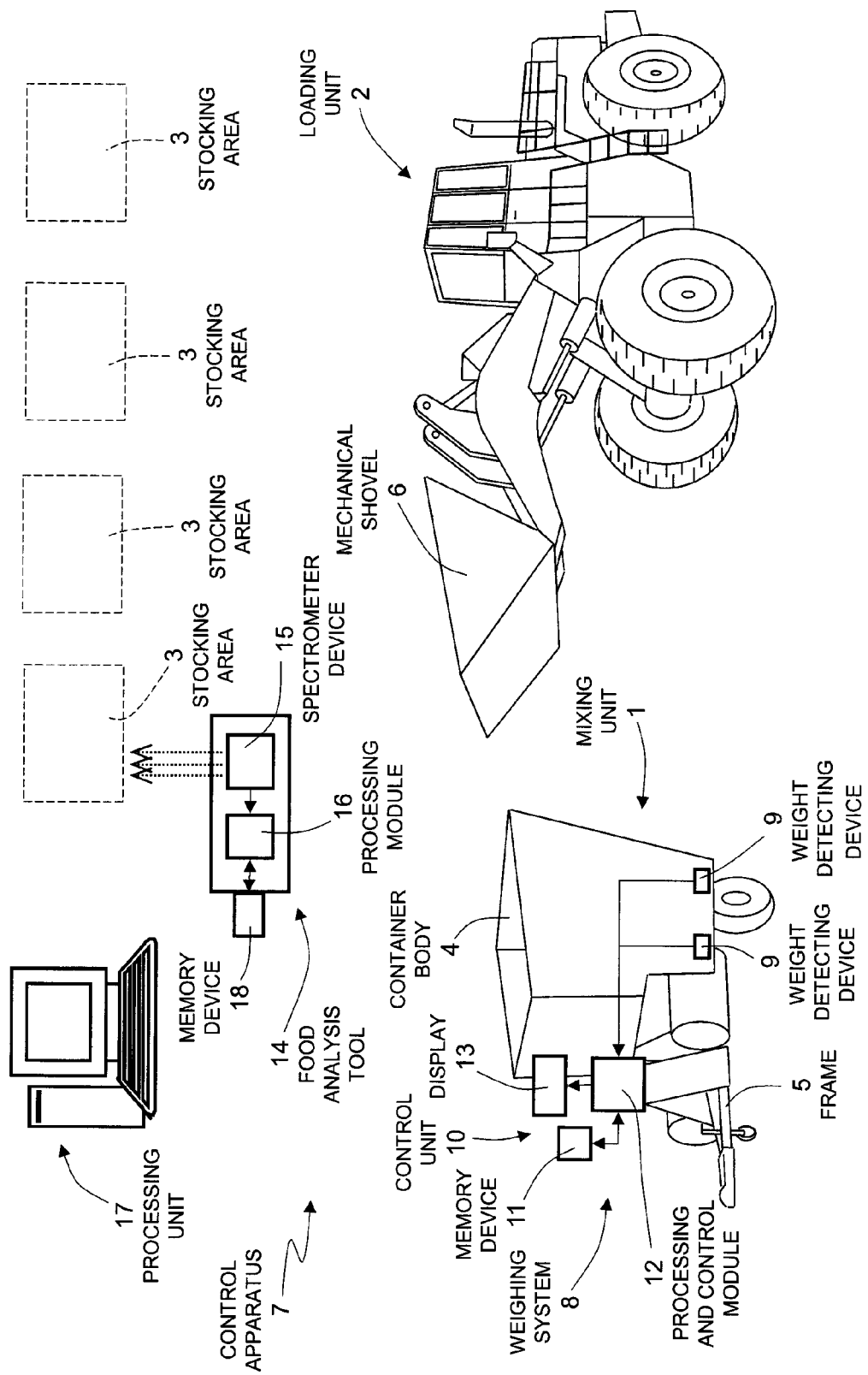

METHOD FOR CONTROLLING LOADING OF FOODS IN A FOOD MIXING UNIT AND CORRESPONDING CONTROL APPARATUS

The present invention relates to a method for controlling loading of foods into a food mixing unit and a corresponding control apparatus.

In particular, the present invention is advantageously, but not exclusively applied in the livestock sector to control the loading of animal foods into a mixer wagon or shredder-mixer using a mechanical shovel mounted on a motor vehicle, to which the following description will explicitly refer without loss of generality.

BACKGROUND OF THE INVENTION

The diet of farm animals, such as cattle, is usually prescribed by a specialist, typically a nutritionist. In detail, the nutritionist identifies, by way of laboratory analysis, a series of information on chemical components and nutritional values, such as starch, proteins, dry matter etc., that characterize each of the foods prescribed in the animal's alimentary diet and then determines, based on the identified chemical components and nutritional values for each food and on the base of animals nutritional needs resulting from their physical and productive conditions, the correct ration of food, in terms of absolute weight for each food, to be introduced in the alimentary diet.

In many livestock farms, the dosage of each food and the preparation of the food ration to be administered to each animal are made via a mixer wagon, in which are loaded by way of mechanical shovels or other loading systems mounted on motor vehicles, the different foods based on respective weights of alimentary diet predetermined by the nutritionist.

The latest generation mixer wagons are equipped with a weighing system, which comprises one or more load cells coupled with the frame and/or container body of the mixer wagon to detect the weight of the foods loaded into the container body and an electronic control unit connected to the load cells to measure moment by moment, the weight of the food deposited by a mechanical shovel or any other charging system in the container body and check that the loaded food weight reaches the respective predetermined weight. In detail, the electronic control unit comprises a memory for memorizing at least one recipe for foods to be loaded into the mixer wagon, a processing and control module configured to control, based on the recipe, the weight of foods as they are loaded into the mixer wagon and a display to indicate to an operator the weight measured moment by moment and the achievement of the absolute weight of the food contained in the recipe. Alternatively, the electronic control unit is connected to an external electronic device, such as a handheld computer to receive from the latter the food recipe.

It often happens that the various foods that make up the recipe should be taken from different stocking areas or depots subject to prolonged exposure to the weather conditions, which modify, as known, the percentages of chemical components of food and, therefore, significantly alter the nutritional values of food. Therefore, with the same "fresh weight" of food fed to the animal, the nutritional values actually administered may vary significantly from those provided by the "theoretical" alimentary diet established by the nutritionist. Consequently, nutritionally imbalanced conditions can result in the animal, which can also adversely affect the physical condition of the animal and however lead indirectly to a decline in quality and quantity of the products obtained from the animal itself (milk, manure, etc.). Nutritionists are well aware of this risk and therefore tend to provide diets to meet the nutritional needs of animals even in worst case conditions, by administering, in most cases, diets with excess proteins that drives up food costs more than actually necessary. It should be added that when an animal ingests a quantity of proteins in excess of its needs, the animal transforms, through the digestive cycle, the excess proteins in nitrogenous compounds that are expelled in the form of stool: the environmental impact is not negligible and of course proportional to the number of animals given an alimentary diet with excess proteins.

SUMMARY OF THE INVENTION

The aim of the present invention is to provide a method to control the loading of foods into a food mixing unit and to produce a corresponding control apparatus, which method and apparatus provide a solution to the problem described above and at the same time, are accessible and economically feasible.

In accordance with the present invention a method and a control apparatus are provided to control the loading of foods into a mixing unit as defined in the appended claims.

BRIEF DESCRIPTION OF THE DRAWINGS

The present invention will now be described with reference to the attached single FIGURE, which shows a non limitative embodiment thereof.

DETAILED DESCRIPTION OF THE INVENTION

In the attached FIGURE, with 1 is shown a food mixing unit, which is preferably, but not necessarily, of movable type, with 2 is shown a loading unit capable of loading foods in the mixing unit 1 and with 3 are indicated food stocking areas, in each of which is stored a quantity of a relative food to be loaded into the mixing unit 1. The mixing unit 1 consists, for example, of a mixer wagon or similar comprising a container body 4 to receive and contain the foods to be mixed, a frame 5 for supporting the container body 4 and a mixing group (not shown) mounted inside the container body 4. The loading unit 2 is movable in order to reach one stocking area 3 at a time and deliver a quantity of the relative food to the mixing unit and consists, for example, of a motor vehicle equipped with a mechanical shovel 6. FIG. 1 also illustrates a control apparatus 7 to control the loading of foods into the mixing unit 1.

The control apparatus 7 comprises a weighing system 8, which is installable on the mixing unit 1 and comprises one or more weight detecting devices 9 for detecting the weight of foods loaded into the mixing unit 1 and an electronic control unit 10 connected to the weight detecting device 9 to process and display the detected weight. Each weight detecting device 9 consists of, for example, a respective load cell coupled in known manner with the container body 4 and/or the frame 5 of the mixing unit 1. The electronic device 10 comprises a memory device 11 for memorizing at least one food recipe to be loaded into the mixing unit 1 and a processing and control module 12 configured to control, based on the detected weight and the stored food recipe, the weight of foods as they are loaded into the mixing unit 1, for example, to determine in real time, the amount by weight still to be loaded for each food in the recipe. The food recipe comprises, in fact, a list of foods to be loaded, and for each food, a respective target weight to achieve with the loading. The electronic control unit 10 also comprises a display 13 consisting, for example, in an LCD screen to provide an operator with information regarding the food loading, such as the amount by weight of the foods still to be loaded and measured moment by moment.

Alternatively, the food recipe is memorized in another memory device (not shown) that is external to the weighing system 8, for example, the memory of a handheld computer, which is connected to the electronic control unit 10 for providing to the latter indication of the food to be loaded and the respective target weight during the loading of the mixing unit 1.

The loading control of foods in a mixing unit 1 is in accordance to a method which envisages collection by way of loading unit 2, each recipe food from at least one relative stocking area 3, and loading, using the loading unit 2, each food taken from the mixing unit 1 and monitoring, by way of the weight detecting devices 9 and based on the food recipe, the foods weight step by step as they are loaded into the mixing unit 1.

According to the present invention, the control method for the loading of foods into a mixing unit comprises the further steps of measuring for each food stocked in the relative stocking area 3, a plurality of chemical and/or physical parameters by a food analysis tool 14, modifying the food recipe by means of measured values of chemical and/or physical parameters and writing the modified food recipe in the memory device 11 of the weighing system 8. These additional steps are performed prior to loading of the mixing unit 1. Therefore, the weight of foods is controlled, step by step as they are loaded into the mixing unit, based on the weight measured by the weight detecting device 9 and the modified food recipe. In this way the loading of the mixing unit 1 with the foods taken in the different stocking areas 3 is controlled by significantly compensating for the variability of the nutritional values of foods in the stocking areas 3, with the important dual advantage of providing an alimentary diet established by the nutritionist more specific to the real needs of livestock and providing the actually applied alimentary diet to the animals more specific to the alimentary diet of the nutritionist.

The food recipe comprises a list of foods to load and, for each food, a respective target weight. The list of foods in the recipe comprises, for example, one or more of the following foods: corn silage, hay, high moisture corn, alfalfa hay, grass silage, soybean flour, etc. The chemical and/or physical parameters for each food comprise the percentage of water in the food. The step of modifying the food recipe according to the measured values of chemical and/or physical parameters envisages the correction of actual weight of each food according to the measured respective value of the percentage of water.

Advantageously, the chemical and/or physical parameters for each food comprise, in addition to the percentage of water, one or more of the following parameters: Crude Protein, fibrous components (NDF and ADF), Starch, Ash and "Crude Fat". The step of modifying the food recipe as a function of the measured values of chemical and/or physical parameters envisages the correction of the target weight of each food according to the measured values of one or more of the chemical and/or physical parameters described above.

The control apparatus 7 implements the method to control the loading of foods into a mixing unit as described below.

The control apparatus 7 comprises a food analysis tool 14, which comprises a spectrometer device 15 in order to measure chemical and/or physical parameters of a food to be analyzed on the basis of the spectrophotometric response of the food in the region of the so-called "near-infrared" (NIR). In particular, the spectrometer device 15 is capable of emitting towards the food to be tested, a beam of electromagnetic radiation in the near infrared region and to provide a corresponding spectrum signal that represents the spectrum of electromagnetic radiation reflected from the food. The food analysis tool 14 comprises, in addition, a processing module 16 for processing the spectrum signal and providing values of chemical and/or physical parameters that characterize the food analyzed. The food analysis tool 14 is in itself known and is not described in further detail.

The control apparatus 7 comprises a processing unit 17, which is external and independent from the weighing system 8, and therefore from the electronic control unit 10, consisting of a generic computer, such as a desktop computer, a laptop computer or a server, and is appropriately programmed to modify the food recipe according to the measured values of chemical and/or physical parameters obtained by the food analysis tool 14. In particular, the processing unit 17 is programmed to correct the target weight of each food according to its value measured by the percentage of water and/or other chemical and/or physical parameters. The processing unit 17 is configured to write the food recipe modified in the memory device 11. Conveniently, the processing unit 17 stores a database of food recipes, for example, a number of recipes for the mixing unit 1 and/or food recipes for different types of animals and/or food recipes for different livestock farms. Finally, the processing unit 17 is configured to calculate, based on the values measured by the food analysis tool 14, further indicators, for example, in the case of dairy cows, the Net Energy of Lactation (NEL).

The food analysis tool 14 is equipped with a memory device 18 for memorizing the measured values of chemical and/or physical parameters of all foods analyzed in the relative stocking areas 3. The memory device 18 is removable and portable so that an operator can easily transfer the content therein to the processing unit 17 after completing the analysis of all foods. Also the memory device 11 is removable and portable so that an operator can transfer the food recipe modified by the processing unit 17 to the weighing system 8 after the central processing unit 17 has changed the food recipe.

The memory device 11 of the weighing system 8, for example, consists of a memory card. Accordingly, the weighing system 8 and the processing unit 17 comprise respective card readers (not shown) compatible with the memory card 11. The memory device 18 is formed, for example, by a so-called USB key ("USB flash drive") connectable to a USB port of the food analysis tool 14 or a USB port of the processing unit 17.

According to a further embodiment of the invention, not described, the weighing system 8, the food analysis tool 14 and the processing unit 17 are provided with respective forms of wireless communication to transfer, by RF transmission, the measured values of chemical and/or physical parameters by the food analysis tool 14 to the processing unit 17 and the modified food recipe from the processing unit 17 to the weighing system 8.

The main advantage of the control method for the loading of foods into a food mixing unit and of the corresponding control apparatus 7 described above is that the foods taken from stocking areas 3 are loaded into mixing unit 1 with a weight percentage substantially corresponding to the real needs of livestock, although the stocking areas 3 are not likely to conserve for an extended period, the original or theoretical nutritional values of foods stored therein. In other words, the method for controlling the loading of foods of the invention can compensate for the inevitable variability of the nutritional values of foods in various stocking areas 3, with the dual beneficial effect of better aligning the diet formulated by the nutritionist to the animals needs and to better aligning the diet of the nutritionist to the diet effectively applied to the animals. In addition, the control apparatus 7 is particularly advantageous when the number of mixing units 1 to be upgraded is high. It follows that the balance of animal alimentation is maintained for the benefit of animal health, the quality and quantity of products obtained from the animal itself, the environmental impact (reduced amount of contaminants in animal feces) and food costs.

The invention claimed is:

1. Method for controlling loading of foods in a food mixing unit, which method comprises:
   providing the food mixing unit (1) with a weighing system (8), which comprises at least one weight detecting device (9) for detecting a weight of foods loaded, and with at least one food recipe, which comprises a list of foods to be loaded in the food mixing unit (1);
   taking each food of the food recipe from at least one relative stocking area (3);
   measuring, for each food when the food is stocked in the relative stocking area (3), prior to loading the mixing unit (1), a plurality of chemical and/or physical parameters by means of a food analysis tool (14);
   modifying said food recipe as a function of measured values of said chemical and/or physical parameters, prior to loading the mixing unit (1); and
   controlling, based on the weight detected by means of the weight detecting device (9) and on the modified food recipe, the weight of the foods to be loaded as the foods are loaded in the food mixing unit (1).

2. Method according to claim 1, wherein said chemical and/or physical parameters of each food comprise a water percentage of the food.

3. Method according to claim 1, wherein said weighing system (8) comprises a memory device (11) for memorizing said food recipe; the method comprising furthermore:
   writing the modified food recipe in the memory device (11), prior to loading the mixing unit (1).

4. Method according to claim 1, wherein said food recipe is modified by means of a processing unit (17) which is external from and independent of said weighing system (8).

5. Method according to claim 1, wherein said food recipe comprises, for each food of said list of foods, a respective target weight; and said modifying said food recipe as the function of the measured values of said chemical and/or physical parameters comprises:
   correcting the target weight of each food as a function of a respective measured value of at least one of said chemical and/or physical parameters.

6. Control apparatus for controlling loading of foods in a food mixing unit; the control apparatus (7) comprising:
   a memory device (11), which memorizes at least one food recipe comprising a list of foods to be loaded in the food mixing unit (1),
   a weighing system (8), which is installable on the food mixing unit (1) and comprises at least one weight detecting device (9) for detecting the weight of the foods loaded and an electronic control unit (10) configured to control, based on the detected weight and on the food recipe, the weight of the foods to be loaded as they are loaded in the food mixing unit (1),
   a food analysis tool (14), which is suitable for measuring, for each food of the food recipe when the food is stocked in a relative stocking area (3), a plurality of chemical and/or physical parameters, and
   a processing unit (17), which is external from and independent of said weighing system (8), is programmed to modify the food recipe as a function of measured values of said chemical and/or physical parameters and is configured to transfer the modified food recipe in the memory device (11).

7. Control apparatus according to claim 6, wherein said food recipe comprises a list of the foods to be loaded and, for each food of said list of foods, a respective target weight; said chemical and/or physical parameters of each food comprise at least a water percentage of the food; said processing unit (17) being programmed to correct the target weight of each food as a function of the respective measured value of the water percentage.

8. Control apparatus according to claim 6, wherein said food analysis tool (14) comprises a spectrometer device (15).

9. Control apparatus according to claim 6, wherein said electronic control unit (10) comprises said memory device (11).

10. Control apparatus according claim 6, wherein said memory device (11) is connectable with said electronic control unit (10) for providing the latter with an indication of the food to be loaded and the respective target weight of the food to be loaded.

* * * * *

UNITED STATES PATENT AND TRADEMARK OFFICE
CERTIFICATE OF CORRECTION

PATENT NO. : 8,651,730 B2  
APPLICATION NO. : 13/088060  
DATED : February 18, 2014  
INVENTOR(S) : Alberto Barbi Page 1 of 1

It is certified that error appears in the above-identified patent and that said Letters Patent is hereby corrected as shown below:

In the Claims:

Col. 6, line 43, delete "the" (first occurrence) and insert --a-- therefor.

Signed and Sealed this  
Twenty-second Day of September, 2015

Michelle K. Lee  
*Director of the United States Patent and Trademark Office*